Feb. 26, 1963  N. A. KRUSE  3,078,929
CULTIVATOR
Filed April 3, 1961  6 Sheets-Sheet 1

United States Patent Office 3,078,929
Patented Feb. 26, 1963

3,078,929
CULTIVATOR
Neils A. Kruse, 841 N. Western, Park Ridge, Ill.
Filed Apr. 3, 1961, Ser. No. 100,092
9 Claims. (Cl. 172—302)

The invention relates generally to cultivating machines, but relates more particularly to cultivating machines for use in nurseries where special conditions obtain.

In nurseries where shrubs, bushes, evergreens and trees are grown, such plants are planted in spaced parallel rows, usually on centers of from forty-two to sixty inches apart. It will be understood that when the plants are small most of the soil between the rows will need cultivation. As the plant increases in size, less and less soil between the rows of plants is available for cultivation. Also, particularly with certain types of plants or possibly due to unusual weather conditions, limbs of the plants may spread laterally to a considerable extent and lie on or close to the ground.

It will also be understood that the plants while seedlings may, when planted, be of such relatively low height that they could easily be straddled by a cultivator, but, as they grow, the increased height makes such operation either unpracticable or objectionable for several reasons.

At the present time several methods of nursery cultivation are in use.

One method is to use a so-called walking type rototiller which is a device that includes rotating knives or members which enter the soil. Such machines are not adjustable as to width and are of such size that it usually requires two trips along the path between rows in order to cultivate all of the soil. Not only is this slow and laborious, but, often, low-lying plant limbs will be cut up by the rotating knives or blades. Also, at times, the larger limbs of the trees, shrubs or the like extend into and are engaged by the engine which is usually very hot and which is likely to damage the limbs which come in contact with it.

A more primitive method of cultivation is to employ a farm type cultivator using a horse or mule to pull the cultivator. This is a slow, expensive and laborious method.

Still another method sometimes employed in nursery cultivation is to use a farm type tractor to pull a cultivator. In this method the apparatus straddles the row of plants. However, the framework or other parts of such apparatus are so low that cultivation is limited to plants of relatively low height.

From the foregoing, which mentions but some of the factors involved, it can be seen that cultivation between the rows of plants in a nursery presents a number of problems because of the various and often conflicting requirements.

The general object of the invention is to provide a cultivating machine which can be used to cultivate substantially all the soil that requires cultivation between the rows of plants from the time the plants are small seedlings until, as, for example, in the case of tree seedlings, they grow into large nursery trees.

Again it is an object of the invention to provide a cultivating machine that can be successfully and practically operated to cultivate the soil between rows of plants where the centers of the row planting vary to a large extent.

A further object of the invention is to provide a cultivating machine that can be used to cultivate the soil between plant rows and which will not damage the plants.

Another object of the invention is to provide a cultivating machine which will be sufficiently heavy to cultivate efficiently and yet, even though there may be low-lying limbs of the plants on or close to the soil to be cultivated, will remove them from the path of the cultivator in undamaged condition.

It is also an object of the invention to provide a power driven cultivator on which an operator can ride and, at the same time, quickly and easily adjust the cultivator to meet varying conditions met with in nursery cultivation, without the necessity of stopping the cultivator to make the necessary adjustments.

Again it is an object of the invention to provide a cultivating machine for nursery use, which shall be so constructed that cultivation close to the plants can be done without damage to the plants and whereby the amount of hand hoeing required is greatly reduced.

Other objects of the invention are to provide a power driven cultivating machine which, while of sufficient weight to permit the required type of cultivation for converting the compacted soil into an open or rough condition, will not leave compacted areas where wheels of the machine engage the soil.

It is also an object of the invention to provide a power driven cultivating machine for the purpose mentioned which shall be of sturdy construction well adapted to accommodate itself to the relatively rough and uneven soil met with in nursery practice.

Further objects of the invention will appear as the specification proceeds to describe the preferred form of the invention as disclosed in the accompanying drawings in which.

*General Statement Regarding Construction and Operation of Applicant's Machine*

The machine comprises a wheeled vehicle having a chassis frame, a pair of front wheels A' mounted for steering movement and actuable by an operator, seated on the vehicle, through what is or may be a conventional hand wheel and associated steering gear. The machine also comprises a pair of large rear wheels F spaced further apart than the front wheels.

On the vehicle there is a prime mover A in the form of an internal combustion engine operatively connected to rotate a drive shaft B which is connected to operate a transmission C, the latter being operatively connected to actuate a differential E. The differential E, which is preferably of the power lock type so that if one wheel spins, the other takes over, is operatively connected to drive the rear wheels F.

At the front of the vehicle is a front shield G, and at the rear, covering the rear wheels are shield members HR and HL, rearwardly of which are shield members IR and IL. Intermediate the front shield G and the rear shields KR and KL are shield structures KR and KL.

Protected by the intermediate shields HR and HL are cultivating means LR and LL. At the rear and between the shields IR and IL is rear cultivating means which is mounted on a trailer M, the latter being connected to the main vehicle to be pulled thereby.

Figures 1, 2, 13:
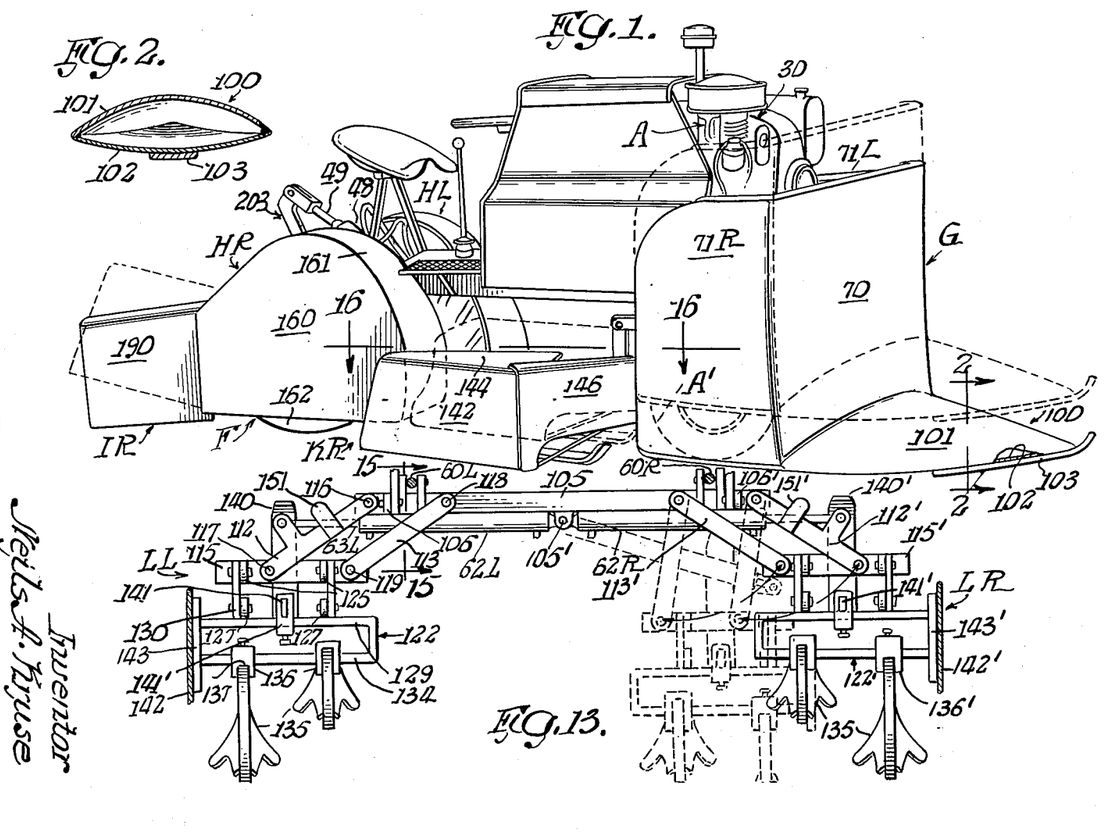
FIGURE 1 is a perspective view of the machine when viewed from the right-hand side thereof, the full lines showing certain parts in the operating position and the dotted lines showing those parts in transport position or non-operative position.
FIG. 2 is a detail vertical sectional view through a part of the divider nose on the front shield of the machine as taken on the line 2—2 of FIG. 1.
FIG. 13 is a horizontal sectional view as taken on the line 13—13 of FIG. 5 showing the mid or forward cultivator section in plan with associated shield omitted for illustrative purposes.

The front shield is mounted for vertical movement between lower and upper inoperative positions as shown by the full and dotted lines, respectively, in FIG. 1.

The front cultivating means LR and LL and the intermediate shields KR and KL, which are connected to move therewith, are mounted for vertical movement between lower operative and upper inoperative positions.

The various movable parts above briefly described, and which will be described in detail later, are controlled by the operator on the seat of the vehicle by means of the hydraulic valve structure N and a plurality of hydraulic cylinders containing pistons and piston rods, the latter being connected to mechanism designed to impart the desired movement to the respective parts.

Figure 17:
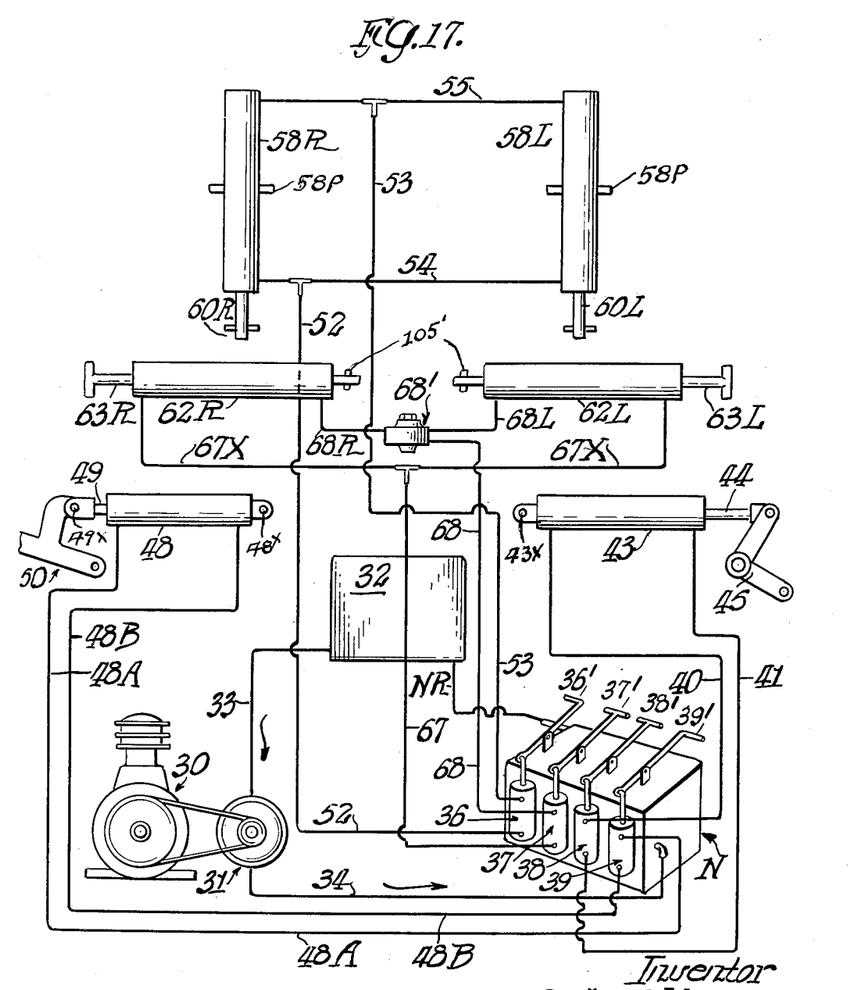
FIG. 17 is a diagrammatic view showing the hydraulic circuit and certain of the associated parts.

However, before proceeding to describe the details of the various mechanisms, it will be helpful to an understanding thereof to describe FIG. 17 which schematically illustrates the hydraulic circuit and parts associated therewith.

*The Hydraulic Circuit and Associated Parts*

Referring now to FIG. 17, 30 is an internal combustion engine which, in addition to driving the hydraulic pump 31, serves as the motive power for moving the vehicle on which the parts are mounted and to pull the trailer M before mentioned. However, since this view is solely for the purpose of showing the hydraulic circuit and associated parts, the vehicle and the drive have not been illustrated.

The hydraulic pump 30 is connected to draw hydraulic fluid from the reservoir 32 through line 33 and to discharge the same under pressure through line 34, the latter being connected to the hydraulic valve structure N which, in turn, is connected to provide hydraulic fluid under pressure to the four independent spool valves 36, 37, 38 and 39, the spools of the valves being shiftable by means of pivoted swingable levers 36', 37', 38' and 39' to move the spools either way from a neutral position.

By means of lines 40 and 41, fluid under pressure can be supplied to actuate the piston in cylinder 43 in the desired direction to cause movement of the piston rod 44 and rocking of the bell crank 45 and connected parts, thereby raising or lowering the front shield G under the control of the operator, the fluid flowing through one line and returning to the valve through the other.

In like manner hydraulic fluid under pressure can be supplied to and returned from cylinder 48, by means of lines 48A and 48B, to move the piston in the cylinder and connected piston rod 49 in order to rock pivoted lever 50 to which the cultivating assembly on the trailer M is operatively connected and whereby the said cultivator assembly can be raised and lowered.

Main lines 52 and 53 from the associated control valve supply hydraulic fluid to the lines 54 and 55 or return the fluid therefrom as the case may be, the lines 54 and 55 being connected to like opposite ends of the cylinders 58R and 58L to move the pistons therein and the piston rods 60R and 60L. The piston rods 60R and 60L will, through connected mechanism, serve to raise or lower the forward cultivator assemblies LR and LL.

The forward cultivator assemblies are also mounted for movement toward and away from the longitudinal center line of the vehicle. This is accomplished by means of cylinders 62R and 62L and the pistons therein for actuating the piston rods 63R and 63L, fluid being supplied to and returned from the cylinders by lines 67 and 68, line 67 being connected to cross lines 67X and line 68 being connected to an equalizer valve 68' from which lines 68R and 68L lead to the inner ends of cylinders 62R and 62L, respectively.

The equalizer valve 68' is so constructed that it will supply that amount of pressure to the cylinders 62R and 62L to cause movement of the pistons therein at the same speed, even though the resistance to movement may vary, so that the cultivators will move in and out at the same speed. Fluid returning to the control valves of the main valve structure N returns to the reservoir through line NR. It will be understood that, when the spools of valves 36, 37, 38 and 39 are in one position, fluid is locked in the lines against flow.

Having thus described the general mode of operation of the machine, the specification will proceed to describe the detailed construction of the respective parts.

*The Front Shield G and the Means for Raising and Lowering Same*

The shield G is formed of sheet material and comprises a V-shaped upstanding portion 70 and wing portions 71R and 71L which extend rearwardly beyond the front wheels.

Supported for rocking movement in bearings attached to a fixed part of the vehicle framing is a cross shaft 73 (see FIG. 4) on which are spaced lever arms 74 to which the end of the piston rod 44 of cylinder 53 is pivotally connected. Lever arms 75 and 76 are affixed to the cross shaft 73 and extend downwardly and forwardly therefrom (best shown in FIGS. 4 and 5).

Extending between the shield frame structure, in the form of vertical angle bars 78R and 78L secured to the inner sides of the wings 71R and 71L, is a cross brace 78. Chains 80 and 81 operatively interconnect the lower ends of lever arms 75 and 76 and the cross brace 78 so that rocking of the cross shaft 73 by means of the hydraulic cylinder and its piston rod 44, as before explained, serves to raise or lower the front shield, depending upon the direction of movement of the piston in the actuating cylinder 43. Since the chains 80 and 81 form a loose connection, vertical movement of the front shield G in response to engagement of a lower part of the front shield with the soil, as will be explained shortly, can take place without the movement of the piston rod of the hydraulic control cylinder.

In order to permit the shield structure G to be raised more easily, counter balance springs 90 and 91 are provided. These springs are under tension, being connected at their upper ends to arms 92L and 92R, which are fixed to framing of the vehicle, and to members 93R and 93L.

In order further to brace the wings 71R and 71L, there are vertical angle irons 71′ and 71″ secured to the inner sides of the respective wings just rearwardly of the balance springs 90 and 91, to which are secured the outer ends of parallel pairs of arms 93L and 93R, respectively, the inner ends of the latter being pivotally connected to the depending members 95L and 95R on opposite sides of the machine, the members 95L and 95R being rigidly secured to a part of the vehicle frame.

Extending forwardly from the bottom of the shield structure G is a nose-like extension structure 100 best shown in FIGS. 1 and 2. The nose extension 100 comprises upper and lower sheet members 101 and 102 reversely cambered so that the upper member 101 is bowed upwardly from a median horizontal plane and the lower member 102 is bowed downwardly from that plane. To the bottom of the lower member 102 there is affixed a centrally and longitudinally disposed wear plate 103.

When the shield structure G is in its lower operative position, as shown by full lines in FIG. 1, the wear plate 103 rides on the ground, causing the shield structure to follow the various undulations or irregularities of the ground.

Should there be any low-lying limbs in the path of the nose extension 100, they will be lifted upwardly by the cambered upper sheet 101 until they engage the vertical portions of the front shield which will then press them outwardly in the direction of the adjacent row of plants, without serious damage to such limbs.

The dotted lines in FIG. 1 illustrate the raised inoperative position and the full lines, the operative position. However, in practice the normal operative position is not the lowest position which the shield structure G can assume, but one slightly above the lowest so that, if necessary, the shield can move downwardly, should there be substantial undulations in the earth being cultivated.

The Forward Cultivator Structure

As before explained, the forward cultivator structure comprises like mechanisms LR and LL which are provided with shields KR and KL, respectively. The forward cultivator mechanism is best shown in FIGS. 1, 5, 12, 13 and 15.

The mechanism comprises a transversely arranged tubular frame member 105 just rearwardly of the front wheels of the vehicle. Secured rigidly to and upstanding from opposite ends of member 105 are standard 106 and 106′.

Since most of the views illustrating the forward cultivator show parts on the left-hand side of the machine, they will be described, but, since there are similar parts on the right-hand side, like numbers will be applied to the right-hand side but with the addition of a prime (′) wherever such similar parts have been illustrated and unless previously described and numbered.

Figures 5, 14, 15:
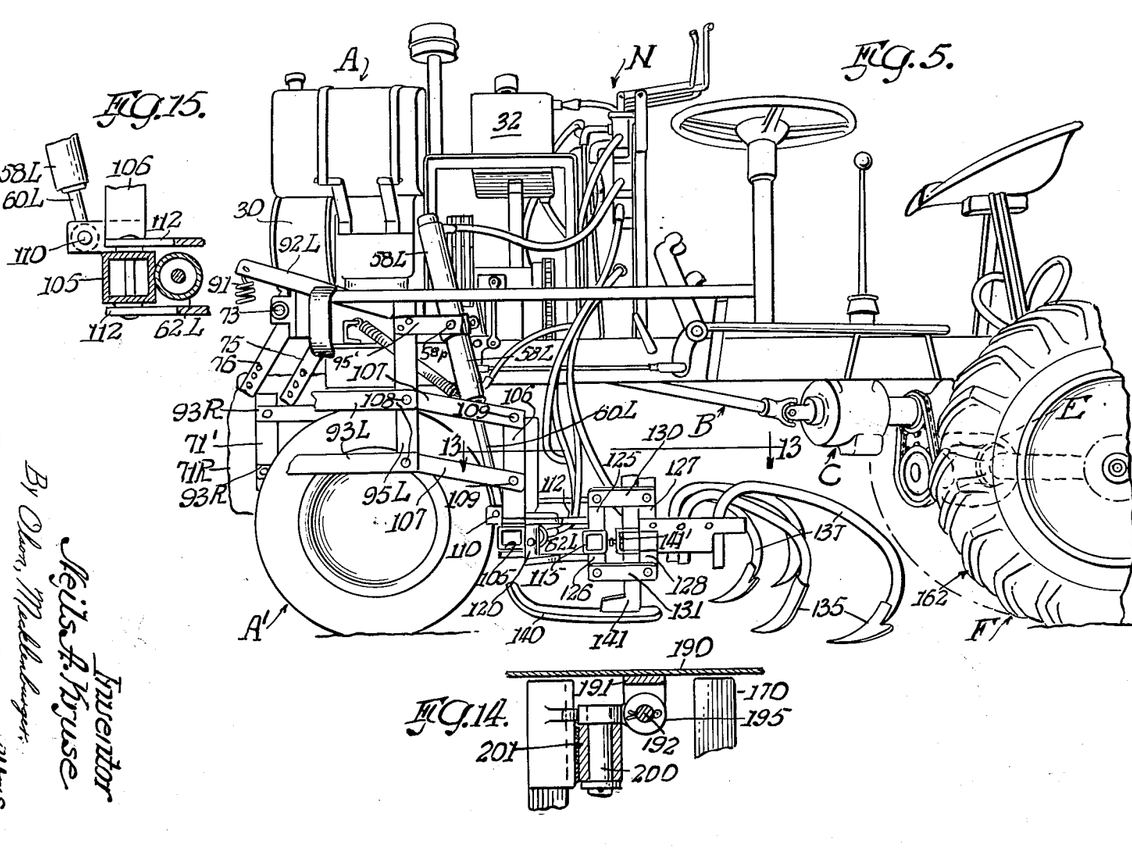
FIG. 5 is a fragmentary perspective view of the left-hand side of the machine as viewed in the general direction of the arrows 5—5 of FIG. 4 with the front shield and the mid shields omitted for a better illustration of the parts thereof.
FIG. 14 is a detail vertical section on the line 14—14 of FIG. 10.
FIG. 15 is a fragmentary detail vertical sectional view as taken on the line 15—15 of FIG. 13.

Extending between the fixed depending members 95R and 95L and the upstanding member 106′ are spaced parallel connecting members 107 pivoted at 108 to the depending member 95L and, at 109, to the upstanding members 106, best shown in FIG. 5.

The lower ends of piston rods 60L and 60R of cylinders 58L and 58R are pivotally connected to the transverse member 105 at 110 and 110′, by means of which the member 105 and the parts connected thereto can be raised and lowered.

Supported by upper and lower pairs of arms 112 and 113 is a short transversely disposed tubular member 115 which swings on vertical pivots 116, 117, 118 and 119, respectively. The member 115 can be moved toward and away from the longitudinal center of the machine by means of hydraulic cylinder 62L, the piston rod 63L of which is connected to a shaft 120 (best shown in FIG. 12) which is pivotally mounted between arms extending outwardly from the members 112 for rocking motion on a vertical axis.

Mounted for "floating" movement is a subframe 122 which is horizontally disposed and which, in plan, is generally U-shaped.

Secured to and extending upwardly and downwardly from the member 115 are spaced pairs of arms 125 and 126. Similar arms 127 and 128 are attached to and extend upwardly and downwardly from the leg 129 of frame 122 (see FIG. 13). Extending between said arms 125 and 126, 127 and 128 are pairs of links 130 and 131 mounted on horizontally disposed pivots.

Secured to the leg 134 of frame 122 are a plurality of cultivator blades 135. Vertical adjustment is provided by clamp members 136 between which and the leg 134 stem portions 137 of the cultivator elements pass.

There is also provided a flat shoe member 140 having an upstanding stem portion 141 secured at 141′ to leg 129 of the frame for vertical adjustment (see FIG. 13).

In practice the parts just described will be positioned so that when the hydraulic control has been operated to lower the parts to operative position the shoe 140 will engage the earth before the end of the downward stroke of the piston. This will serve to raise the "floating" structure 122 a predetermined amount. Therefore, should there be holes or undulations in the soil, the shoe 140 will maintain contact with the soil and assure that the cultivator members 135 will be maintained at desired cultivating depth.

The Shield for the Forward Cultivators

Since the shields at each side are alike, a description of one will suffice for both. The shield comprises a vertical sheet portion 142, the inner side of which is affixed to the outer face of plate 143, as best shown in FIG. 13, so that the shield moves with the "floating" structure 122. The shield also includes an inturned upper portion 144 disposed in a horizontal plane. At the forward part of the shield is a shield member 146 swingable on vertical pivot 147 on a hinge structure, parts of which are attached to the forward vertical margin of plate 142 (best shown in FIG. 16). A tension spring 150, having one end attached to the under side of member 144 and the other end to the end of member 105, is provided. Projecting from link 112 is a stop member 151 which limits the inward swinging movement of member 146 so that spring 150 always keeps member 146 in contact with stop 151. It should be understood that when the shield member 142 is in fully retracted position, as shown by dotted lines in FIG. 1, sheets 160, 142, 146 and 71R are in substantial alignment.

Shields for Rear Wheels

The shields HL and HR, for the rear wheels, need little description since they are not designed to move relative to the vehicle frame or chassis. These shields comprise vertical sheet portions 160 with inwardly extending curved portions 161 which overhang the rear wheels 162. These shields are supported by suitable braces from the frame vehicle frame. The rear part of the shield member 142 is just forward of the front portion of the portion 161 of the rear wheel shield, so that shield for the forward cultivators will clear the same when retracted to a position.

The Trailer or Rear Cultivator Structure

The trailer M carires the rear cultivator means. It comprises a frame structure consisting of transverse members 170 and 171 interconnected by longitudinally disposed members 172 and 173 to form a rigid frame. The frame just described is supported by wheels 174 and 175, being rotatable in suitable bearings carried by the standards depending from the framework of the trailer.

Figure 8:
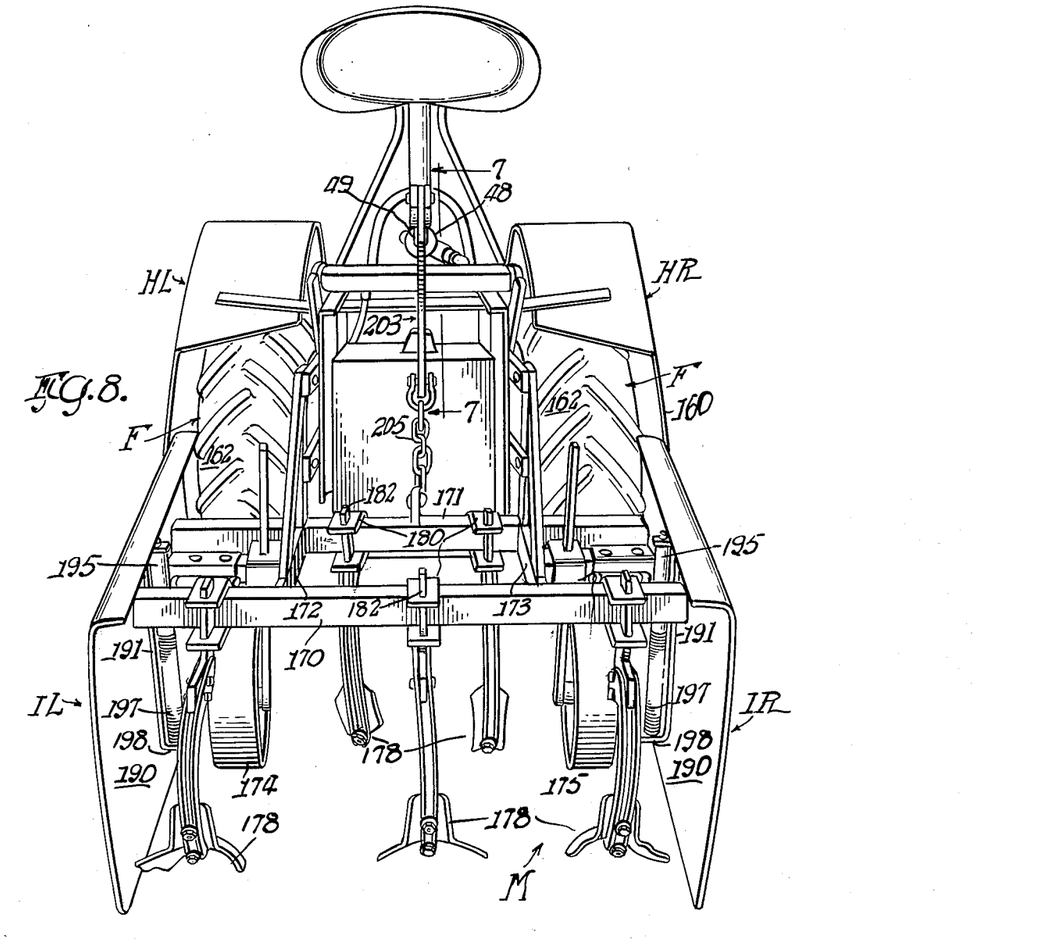
FIG. 8 is a perspective view of the machine as seen from the rear thereof.
Figures 9, 10, 11, 12, 16:
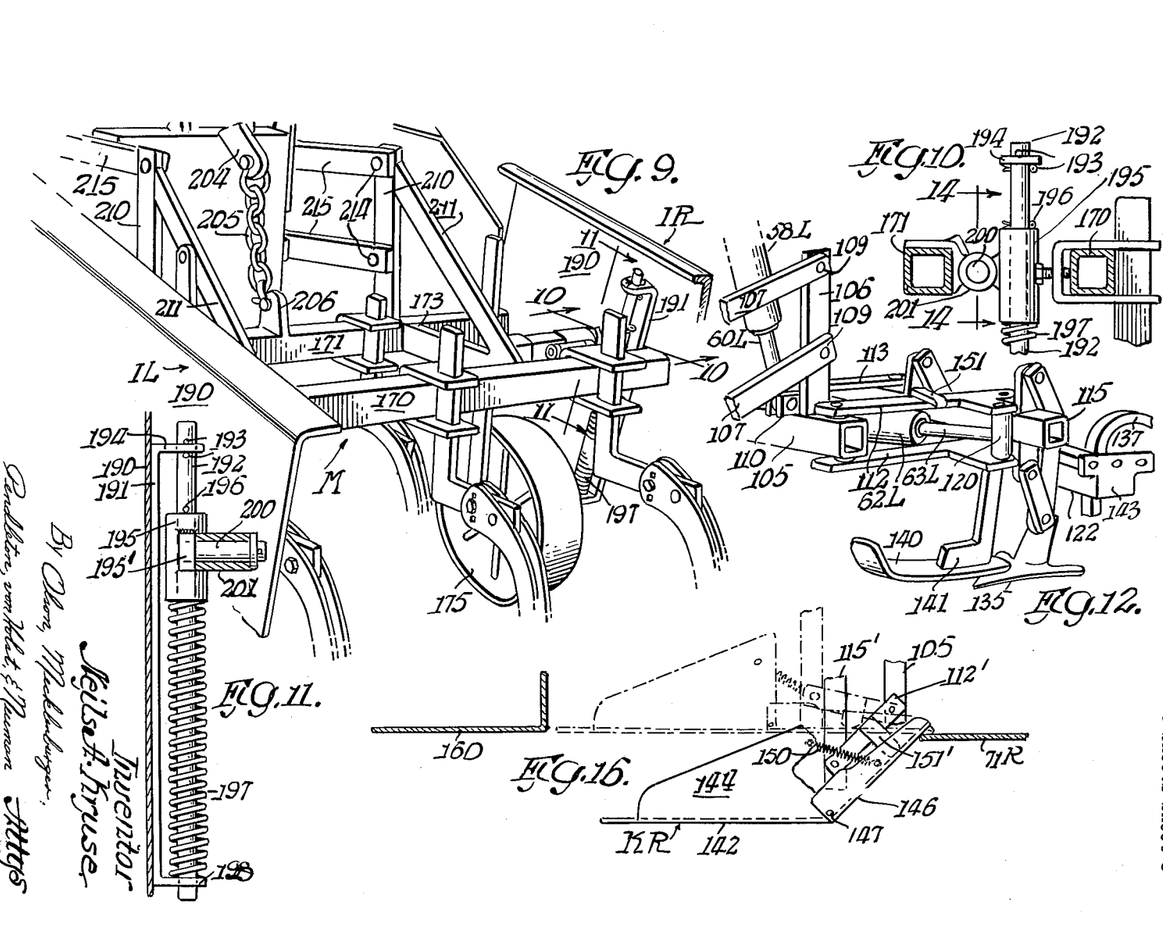
FIG. 9 is a fragmentary perspective view of the cultivator subframe and the rockable and yieldable mounting of the side shield thereof.
FIG. 10 is a vertical detail sectional view as taken on the line 10—10 of FIG. 9, but on an enlarged scale.
FIG. 11 is a vertical detail sectional view as taken on the line 11—11 of FIG. 9, but on the scale of FIG. 10.
FIG. 12 is a fragmentary perspective view of the left-hand end of the middle or forward cultivator portion of the machine when this portion is retracted to the dotted line position of FIG. 13 and with the associated shield omitted better to show the parts involved.
FIG. 16 is a longitudinal detail sectional view as taken on the line 16—16 of FIG. 1, but on a scale somewhat enlarged thereover.

Attached to the frame members 170 and 171 is a plurality of cultivator blades or members. As is best shown in FIGS. 8 and 9, the cultivator members 178 are attached to the frame members 170 and 171 by means of clamps 180 which are shiftable along the members 170 171. Likewise, the cultivator members are vertically adjustable by having more or less of the stem portions 182 projecting through the clamp members 180. It is not thought necessary to describe in detail the other structural features of the individual cultivator elements since they are or may be of conventional construction of the type used in farm cultivation.

The rear shields "floatingly" supported from the trailer frame are best shown in FIGS. 8, 9, 10, 11 and 14. Since the mounting at each side is the same, a description of the mounting at one side will suffice for both.

Attached to the inner side of sheet 190 is a U-shaped bracket 191 in which is mounted a vertical rod 192 held against relative vertical movement by pins 193 adjacent the upper leg 194 of the U-shaped bracket 191.

Mounted on rod 192 is a sleeve member 195 limited in its upward movement by pin 196 and in downward movement by the coiled expansion spring 197 interposed between the lower side of sleeve 195 and the lower leg 198 of the U-shaped bracket.

Secured in a bracket portion 195' of sleeve 195 is a horizontally disposed skid shaft 200 on which is mounted a sleeve 201, the latter being affixed rigidly to a transverse member of the trailer frame. It will be seen from the foregoing that the shield for the trailer is mounted so that rocking and yielding movement can take place, permitting the shield to follow the contour of the soil. It will also be understood that the entire trailer M can be raised and lowered between operative and inoperative positions by means of the before-mentioned hydraulic cylinder 48, piston rod 49, rock lever 203, to the arm 204 of which is attached a chain 205, the lower end of which is attached to an upstanding lug 206.

In the raising and lowering of the trailer M the trailer swings through a slight arc, being guided in this course by vertical and diagonal members 210 and 211, the lower ends of which are rigidly secured to the trailer frame structure and the upper ends thereof being united; to the upstanding members 210, there is secured as by means of horizontal pivots 214 pairs of longitudinally disposed horizontal parallel bars 215.

*Further Comments*

Figure 6:
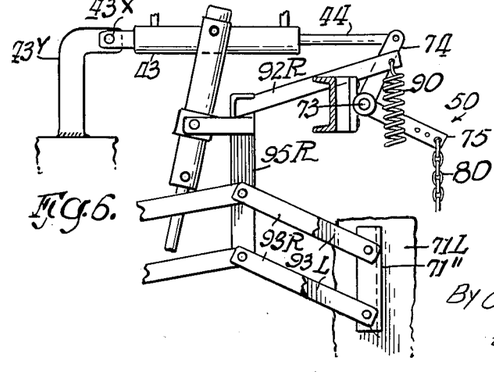
FIG. 6 is a fragmentary vertical detail sectional view of certain parts for raising and lowering the front shield as taken on the line 6—6 of FIG. 4.

It should be mentioned that the various hydraulic cylinders are mounted for swinging movement. Thus the hydraulic cylinder 43 for raising and lowering the shield G is mounted to swing on horizontal pivot 43X of bracket 43Y (see FIG. 6).

Figures 3, 4, 7:
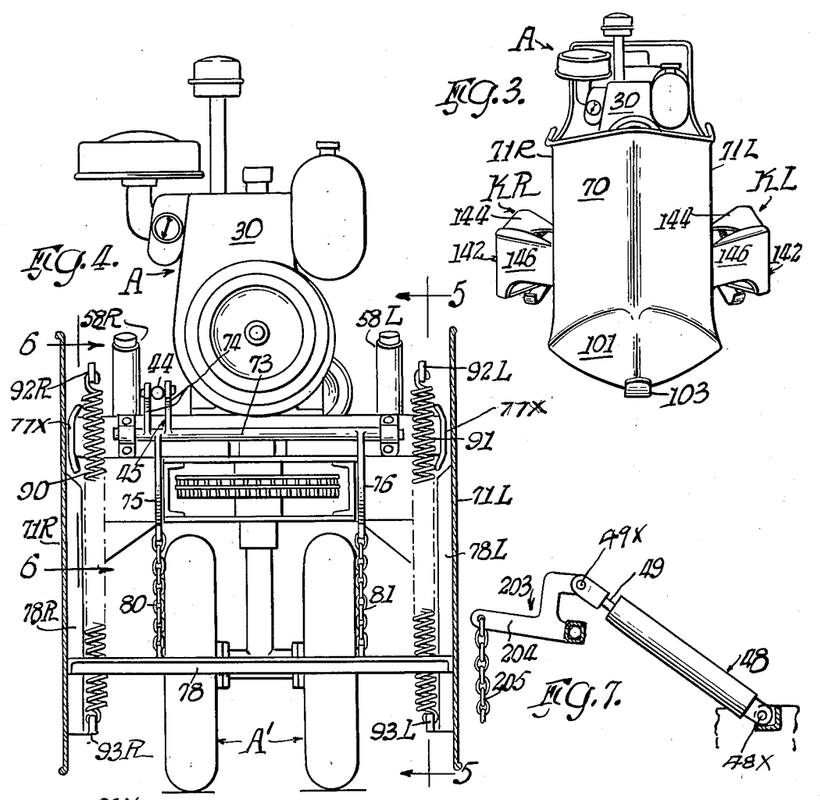
FIG. 3 is a perspective view of the machine when viewed from the front with the mid shields extended and in operating position, but on a scale smaller than that of FIG. 1.
FIG. 4 is a view of the machine when viewed from the front thereof, the side walls of the front shield appearing in vertical section.
FIG. 7 is a fragmentary vertical detail sectional view as taken on the line 7—7 of FIG. 8 showing the hydraulic cylinder and certain parts for raising and lowering the rear cultivator subframe and its side shields.

Cylinder 48 for raising and lowering the rear cultivator mechanism is attached to a horizontal pivot 48X on machine frame and the piston rod thereof is attached to lever 203 (see FIG. 7).

The cylinders 58R and 58L are mounted on horizontal pivots 58P carried by arms 95' of the upright member 95L (see FIG. 5).

Cylinders 62R and 62L are attached to vertical pivot 105' (see FIG. 13). In the diagram FIG. 17 the pivots 105' are shown as spaced apart, but in the actual construction and as shown in FIG. 13 the pivot is located at a common point.

Referring to FIG. 4, members 77X are vertical plates attached to the vehicle frame to limit transverse shifting movement of the front shield G.

I claim:

1. A machine for cultivating soil in the path between spaced rows of nursery plants, comprising in combination:

(a) a self-propelled wheeled vehicle having a frame with supporting wheels;

(b) a front shield having upstanding portions disposed forward of said wheeled vehicle and extending substantially the width thereof whereby branches of nursery plants are deflected to the side of said wheeled vehicle when the machine is propelled between spaced rows of such plants, said front shield also having a forwardly-extending tapered projection centrally disposed at the lower front of said upstanding portions, said tapered projection having an upper surface disposed so as to engage and lift lowlying branches and, in conjunction with said upstanding portions, deflect same without damage thereto to either side of said wheeled vehicle;

(c) means for mounting said front shield forward of said wheeled vehicle, said means permitting movement of said front shield in a vertical direction;

(d) means for causing movement of said front shield in a vertical direction;

(e) a forward pair of cultivator assemblies, each supported from said frame rearwardly of said front shield for opposite sidewise movement between inner and outer positions, said cultivator assemblies in the inner position not extending substantially outwardly from the side extremities of said wheeled vehicle and, in the outer position, extending substantially outwardly from the respective sides of said wheeled vehicle;

(f) means for causing movement of said cultivator assemblies between said inner and outer positions;

(g) means mounting said cultivator assemblies for vertical movement;

(h) means for causing vertical movement of said cultivator assemblies;

(i) side shields connected to move with said front pair of cultivator assemblies and being disposed outwardly of the cultivator assemblies; and (j) shielding means between each of said side shields and said front shield, said shielding means being movably supported so as to maintain substantially continuous shielding therebetween throughout all positions of said cultivator assemblies.

2. The machine of claim 1 wherein said forwardly-extending tapered projection of said front shield has a covered lower portion forming a bottom adapted to engage the soil and cause vertical movement of said shield, responsive to irregularities of the soil in said path.

3. The machine of claim 1 wherein said cultivator assemblies include cultivator elements to enter the soil for cultivating action and supporting means adapted to contact the surface of the soil in said path and to follow irregularities thereof in a substantially vertical direction and being connected to impart like movement to said cultivator elements.

4. The machine of claim 1 including cultivator means rearwardly of said forward pair of cultivator assemblies moving with the vehicle and being formed, positioned and adapted to cultivate at least the soil not cultivated by said forward pair of cultivator assemblies, regardless of the sidewise position thereof, and means shielding the outer sides of the rear cultivating means.

5. The machine of claim 4 including means mounting said rear cultivating means for movement in a substantially vertical direction, and means for effecting substantially-vertical movement thereof.

6. The machine of claim 1 in which said wheeled vehicle comprises supporting wheels at the front and rear of said frame, wherein said front shield covers part of the front and sides of said wheeled vehicle, including the front wheels thereof, and including shields covering the sides of the rear wheels thereof, the latter shields being substantially in the same vertical planes as those portions of the front shield that cover the front side portions of said wheeled vehicle.

9

7. The machine of claim 1 wherein said means for causing movement of said front shield in a vertical direction, said means for causing movement of said cultivator assemblies between said inner and outer positions and said means for causing vertical movement of said cultivator assemblies comprise a plurality of cylinders having fluid-actuable pistons therein with piston rods connected so as to cause such movements, and control means therefor positioned on the wheeled vehicle for actuation by the operator thereof.

8. A machine for cultivating soil in the path between spaced rows of nursery plants, comprising in combination:

(a) a self-propelled wheeled vehicle having a frame with supporting wheels adjacent the front and rear of said frame;

(b) a front shield having substantially-vertical portions disposed forward of said wheeled vehicle and covering parts of the front and sides of said wheeled vehicle, including the front wheels thereof, whereby branches of nursery plants are deflected to the side of said wheeled vehicle when the machine is propelled between spaced rows of such plants, said front shield also having a forwardly-extending tapered projection centrally disposed at the lower front of said vertical portions, said tapered projection having an upper portion disposed so as to engage and lift low-lying branches and, in conjunction with said substantially vertical portions, deflect same without damage thereto to either side of said wheeled vehicle, said tapered projection also having a lower portion with a smooth surface adapted to engage the soil and cause vertical movement of said shield responsive to irregularities of the soil in said path;

(c) means for mounting said front shield forward of said wheeled vehicle, said means permitting movement of said front shield in a vertical direction;

(d) power means for causing movement of said front shield in a vertical direction;

(e) a forward pair of cultivator assemblies, one at each side of said wheeled vehicle and each supported from and below said frame rearwardly of said front shield for sidewise movement between inner and outer positions, said cultivator assemblies in the inner position not extending substantially outwardly from the side extremities of said wheeled vehicle and, in the outer position, extending substantially outwardly from the respective sides of said wheeled vehicle, each of said cultivator assemblies including cultivator elements to enter the soil for cultivating action and supporting means adapted to rest upon the soil in said path and to follow irregularities thereof in a vertical direction and being connected to impart like movement to said cultivator elements;

(f) power means for causing movement of said cultivator assemblies between said inner and outer positions;

(g) means mounting said cultivator assemblies for vertical movement;

(h) power means for causing vertical movement of said cultivator assemblies;

(i) cultivator means rearwardly of both said forward pair of cultivator assemblies and the rear wheels of said wheeled vehicle, said cultivator means moving with the vehicle and being formed, positioned and adapted to cultivate at least the soil not cultivated by said forward pair of cultivator assemblies and the soil compacted by engagement with said rear wheels, said cultivator means including cultivator elements to enter the soil for cultivating action and supporting means adapted to contact the surface of the soil in said path and to follow irregularities thereof in a substantially vertical direction and being connected to impart like movement to said cultivator elements;

(j) means mounting the rear cultivator means for movement in a vertical direction;

(k) power means for causing vertical movement of said rear cultivator means;

(l) a first pair of side shields connected to move with said front pair of cultivator assemblies and being disposed outwardly of the cultivator assemblies;

(m) shielding means including vertical portions between each of said first pair of side shields and said front shield, said shielding means being movably supported so as to maintain substantially-continuous shielding therebetween throughout all positions of said cultivator assemblies between said inner and outer positions thereof;

(n) a second pair of side shields covering at least the outer sides of said rear wheels of said wheeled vehicle and being substantially in the same vertical plane as those portions of the front shield that cover the front side portions of said wheeled vehicle, said second pair of side shields being disposed so as to form with said first pair of side shields substantially continuous shielding adjacent the ground when the shielding is viewed in a direction perpendicular to said vertical plane; and (o) a third pair of side shields covering the outer sides of said rear cultivator means and disposed so as to form with said second pair of side shields substantially-continuous shielding when viewed in a direction perpendicular to said vertical plane.

9. The machine of claim 8 wherein said power means for causing movement of said front shield in a vertical direction, said power means for causing movement of said cultivator assemblies between said inner and outer positions, said power means for causing vertical movement of said cultivator assemblies and said power means for causing vertical movement of said rear cultivator means comprise a plurality of cylinders having fluid-actuable pistons therein with piston rods connected so as to cause such movements and control means therefor positioned on the wheeled vehicle for actuation by the operator thereof.

References Cited in the file of this patent

UNITED STATES PATENTS

| | | |
|---|---|---|
| 1,945,514 | Bowman et al. | Feb. 6, 1934 |
| 2,195,338 | Neuman et al. | Mar. 26, 1940 |
| 2,482,751 | Hartsock et al. | Sept. 27, 1949 |
| 2,558,822 | Claus | July 3, 1951 |
| 2,690,342 | Willey | Sept. 28, 1954 |
| 2,697,975 | Buhr | Dec. 28, 1954 |

UNITED STATES PATENT OFFICE
CERTIFICATE OF CORRECTION

Patent No. 3,078,929                      February 26, 1963

Neils A. Kruse

It is hereby certified that error appears in the above numbered patent requiring correction and that the said Letters Patent should read as corrected below.

Column 3, line 36, for "KR and KL", first occurrence, read -- HR and HL --; line 37, for "HR and HL" read -- KR and KL --; column 5, line 54, for "standard" read -- standards --; column 6, line 71, for "carires" read -- carries --; column 7, line 7, for "170 171" read -- 170 and 171 --.

Signed and sealed this 17th day of September 1963.

(SEAL)
Attest:

ERNEST W. SWIDER                          DAVID L. LADD
Attesting Officer                            Commissioner of Patents